United States Patent Office 2,972,227
Patented Feb. 21, 1961

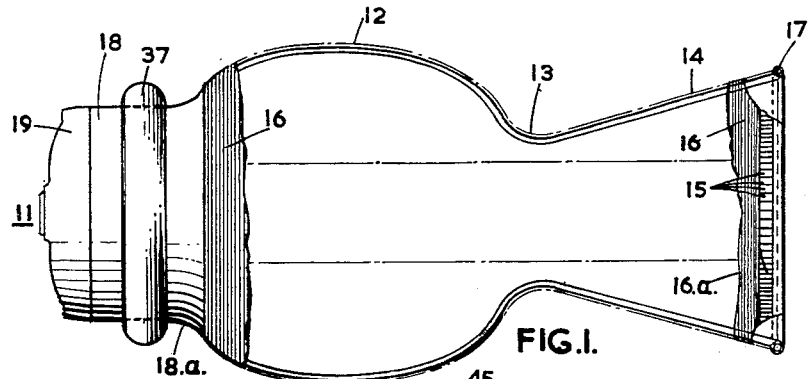
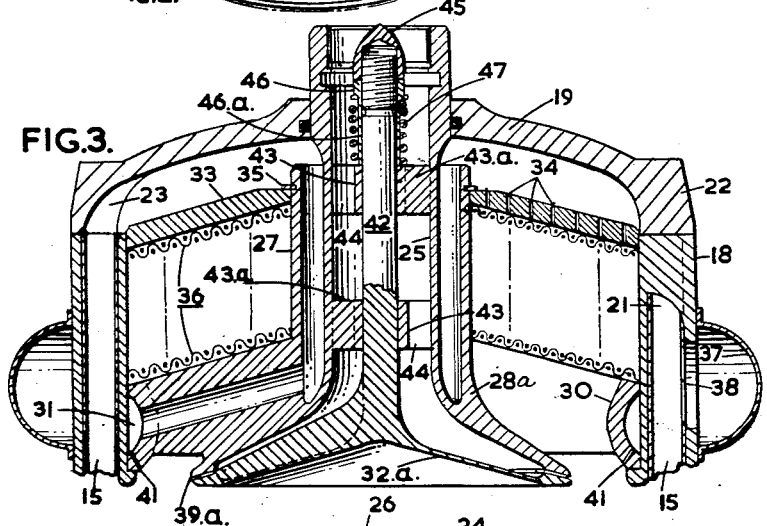
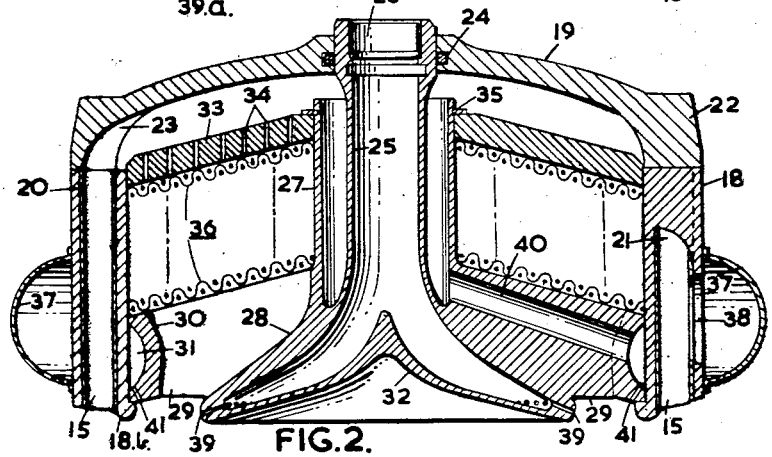

2,972,227

MEANS FOR SUPPLYING A ROCKET MOTOR WITH LIQUID FUEL AND CONCENTRATED HYDROGEN PEROXIDE AS PROPELLANT

Sidney Allen, Coventry, England, assignor, by mesne assignments, to Bristol Siddeley Engines Limited, Bristol, England, a British company Filed July 3, 1957, Ser. No. 669,897

Claims priority, application Great Britain July 5, 1956

5 Claims. (Cl. 60—35.6)

It is customary in rocket motors operating with liquid fuel and concentrated hydrogen peroxide as propellant for the whole of the concentrated hydrogen peroxide to be passed through a catalyst for decomposing it, after which the fuel is fed into the heated gases and spontaneous combustion takes place in the combustion chamber of the rocket motor.

The pressure drop across the catalyst unit, which latter may comprise a stack of gauzes of silver or silver-plated nickel, is relatively high and the support for this unit must therefore be capable of withstanding the resultant end load. Any increase in size of the rocket motor would involve a consequential increase in the size of the catalyst unit and in the load on its support, which latter must therefore be made of correspondingly more robust proportions. The resultant increase in weight of the support and of the catalyst unit could impose a weight penalty which could be a factor limiting the maximum size of such rocket motors for practical use, particularly when applied to an aircraft or other airborne vehicle.

The main object of the invention is to avoid these disadvantages by an improved means of decomposing the concentrated hydrogen peroxide so that the weight of the catalyst unit and the load on its support can be maintaned within practical limits irrespective of the size of the rocket motor to which it is to be applied.

According to the invention hydrogen peroxide decomposing, and spontaneous combustion means, for a rocket motor operating with liquid fuel and concentrated hydrogen peroxide includes at the upstream end of the combustion chamber, a catalyst unit for decomposing a relatively small proportion of the total delivered supply of concentrated hydrogen peroxide, the remainder of the supply being directed in a spray towards a spray of the liquid fuel in the region where the decomposition products of the relatively small proportion of the concentrated hydrogen peroxide are delivered to the upstream end of the combustion chamber.

Preferably, the sprays of liquid fuel and of the said remainder of the concentrated hydrogen peroxide are directed towards each other across the path of the said decomposition products.

Preferably, also, the total delivered supply of concentrated hydrogen peroxide is first passed through a jacket of the combustion chamber for cooling the latter before the relatively small proportion thereof is led to the catalyst unit and the remainder of the supply is fed to the spray. Such a jacket can include a plurality of alternate supply and return passages extending longitudinally of the combustion chamber, the supply passages communicating with a supply of concentrated hydrogen peroxide at the upstream ends and with a header at their downstream ends, and the return passages conveying the hydrogen peroxide from the header to a chamber from which the catalyst unit and spray are fed. These passages, which can be built up from sheet metal or in any other suitable way, can have lateral walls which are substantially radial to the combustion chamber, and they can be welded together, and bound with wire under tension for supporting radial stresses engendered in the combustion chamber.

In the accompanying drawings:

Figure 1 is a side elevation, with portions broken away, of a rocket motor;

Figure 2 is an axial section of the upstream end of the motor of Figure 1; and

Figure 3 is a view similar to Figure 2, but illustrating a modified construction.

The rocket motor shown in Figure 1 has an upstream end 11 containing the catalyst unit, a combustion chamber portion 12, a throat 13 and a divergent nozzle 14. The combustion chamber, throat and nozzle have a common wall, forming a casing, of circular cross-section, which consists of a side-by-side arrangement of tubes 15 which are flattened at their adjacent sides, and are of changing widths (i.e., in the circumferential direction of the motor) so as to compensate for the changes in cross-section of the motor. These tubes are welded in position along their outer edges and bound by steel wire, indicated at 16, having the ends, of which one is shown at 16a, suitably secured to the motor (e.g., by welding). The downstream ends of these tubes communicate with an annular header 17 coaxially fast with the lip of the nozzle, and the upstream ends of these tubes are connected, in the manner presently to be described with reference to Figure 2, so that the upstream ends of alternate tubes will receive a flow of hydrogen peroxide to proceed to the header, and the intermediate tubes receive hydrogen peroxide from the header to flow back to the upstream end of the motor.

Referring to Figure 2 it will be seen that the upstream ends of the tubes 15 are sealingly fast within the thickness of a mounting ring 18, to which an outwardly-dished end-plate 19 is secured by a ring of screws (not shown). The mounting ring has an outwardly flared exterior portion 18a which merges into the curvature of the upstream end of the combustion chamber, and its inner periphery at the downstream end is formed with a radially-inwardly directed lip 18b. Alternate ones of the tubes 15 extend sealingly into through-holes 20 of the mounting ring, and the intermediate tubes extend sealingly into blind holes 21 of the said ring. An axial flange of the end-plate is relieved, as indicated at 23, opposite each through-hole 20 so that the tubes 15 anchored in those holes can communicate with a space at the inner side of the end-plate.

The end-plate has a central hole in which is secured, with an intervening seal 24, the outer end of a tubular wall 25 forming part of a catalyst unit, and the upstream end of the wall 25 is interiorly formed at 26 to receive, in a sealing manner, a liquid fuel supply pipe (not shown).

The downstream end of the wall 25, and of an outwardly-radially-spaced, coaxial, tubular wall 27, are integral with a bell-mouth 28 having integral, radial spokes 29 which are fast with a peripheral rim 30 abutting the lip 18b. This rim is concavely curved transversely at its outer periphery so as in conjunction with the inner periphery of the ring 18, which it sealingly engages, to form an annular manifold 31. The bell-mouth is closed by an integral, substantially conical wall 32 having its concave face directed downstream.

Fitting within the upstream end of the ring 18, and spaced from the end-plate 19, is a frusto-conical plate 33 which forms the upstream wall of the catalyst unit. The plate 33 is perforated as indicated at 34, and it fits snugly round the upstream end of the tubular wall 27 from which it is axially located in one direction by a circlip 35. The cone angle of the plate 33 is the same as the angle made by the upstream edges of the spokes 29, and between the latter and the plate is held a stack of silver, or silver-plated nickel gauzes indicated at 36. For clearness of illustration only a few of these gauzes are shown at each end of the stack, and the stack of gauzes acts as the catalyst proper.

Concentrated hydrogen peroxide is led from a manifold 37 on the exterior of the mounting ring 18, and through ports 38 in the ring to each of the blind holes 21, from which it flows, in liquid form, through the associated tubes 15 and into the nozzle manifold 17. The liquid hydrogen peroxide then returns through the intermediate tubes 15 from the manifold 17 and is delivered into the space between the end-plate 19 and conical plate 33. From this later position a small proportion of the hydrogen peroxide passes through the holes 34 and gauzes to be decomposed and delivered to spaces which exist between the spokes 29. The decomposed hydrogen peroxide passes downstream through a constricted outlet, which accelerates its flow, existing between the rim 30 and the bell-mouth 28, where it encounters jets of fuel issuing through outwardly directed small orifices 39 leading from the space within the bell-mouth and conical wall 32. The decomposed hydrogen peroxide and a proportion of the fuel burn spontaneously, and the remaining hydrogen peroxide passes from the space between the end-plate 19 and conical plate 33 into the annulus between the walls 25 and 27, from whence it passes through ducts 40 in the spokes to the annular manifold 31. The latter is provided with a ring of converging fine orifices 41 through which the non-decomposed hydrogen peroxide is delivered into the zone of spontaneous combustion and obliquely towards the jets of fuel, being intercepted by the accelerated flow of decomposed hydrogen peroxide whereby it is atomised for decomposition and burning with the remaining fuel.

It will be seen that only a small proportion of the hydrogen peroxide is decomposed in the catalyst unit, so only a small catalyst is decomposed in the catalyst unit, so only a small catalyst unit is needed; also that the total delivered supply of hydrogen peroxide cools the motor by flowing through the tubes 15.

The construction illustrated by Figure 3, in which like parts are denoted by the reference characters already used, mainly differs from that of Figure 2 in that provision is made for controlling the delivery of fuel to the combustion chamber in dependence on the pressure of the fuel supply. For this purpose the conical wall 32a is formed separately from the bell-mouth 28a and has a stem 42 which is guided in bearings 43, supported by webs 43a from the wall 25. The openings 44 between the webs permit the passage of the fuel, and the remote end of the stem is screw-threaded to receive a lock-nut 45. The latter locks in an adjusted position on a screw-thread of the stem a retainer 46 for one end of a spring 47 which reacts on the web 43 to hold the conical wall 32a sealingly against the adjacent end of the bell-mouth when there is no fuel pressure. When, however, fuel is being supplied it acts on the conical wall 32a so as to move it away from the bell-mouth, against the action of the spring. In this instance the meeting faces of the bell-mouth and conical wall are smooth and define, when open, an annular orifice 39a to act as the fuel delivery to the combustion chamber. As the pressure of the fuel supply increases the spring 47 will be additionally compressed to increase the width of the orifice 39a to an extent which is limited by the engagement of an end of a sleeve 46a, integral with the retainer 46, with the adjacent bearing 43; and by adjusting the nut 45 the required setting of the said orifice can be adjusted.

What I claim as my invention and desire to secure by Letters Patent of the United States is:

1. A rocket motor, operating with liquid fuel and concentrated hydrogen peroxide, comprising a casing, a combustion chamber within said casing, an annular catalyst unit within said casing at the upstream end of said combustion chamber, said casing being formed with a cooling jacket, a communication between said cooling jacket and a supply of concentrated hydrogen peroxide, means providing a chamber within said casing upstream of said combustion chamber into an inlet of which chamber said cooling jacket discharges, said chamber having a perforated annular downstream wall, the perforations in said annular downstream wall providing an inlet to said catalyst unit for a small proportion of said concentrated hydrogen peroxide in said chamber, said catalyst unit having an annular outlet leading into said combustion chamber for the said small proportion of concentrated hydrogen peroxide decomposed in said unit, means for delivering the remaining proportion of said concentrated hydrogen peroxide in said chamber to nozzle means downstream of said catalyst unit for spraying said remaining proportion in liquid form into said combustion chamber, and a fuel spray device delivering into the upstream end of said combustion chamber, said nozzle means and said fuel spray device being disposed so as to be separated by the inner and outer peripheries of said annular outlet from said catalyst unit, and said nozzle means and said fuel spray device being adapted to direct their respective sprays towards each other through the decomposed concentrated hydrogen peroxide issuing from said annular outlet.

2. A rocket motor, according to claim 1, in which the inner periphery of the catalyst unit is defined by a tubular wall through which the remaining proportion of the concentrated hydrogen peroxide is led from the chamber to the nozzle means.

3. A rocket motor, according to claim 2, in which the fuel is led from a supply and through a tube coaxially within the tubular wall to the spray device.

4. A rocket motor, operating with liquid fuel and concentrated hydrogen peroxide, comprising a casing, a combustion chamber within said casing, a catalyst unit within said casing and at the upstream end of said combustion chamber, said combustion chamber being formed with a cooling jacket including a plurality of alternate supply and return passages extending longitudinally of said combustion chamber, a communication between the upstream ends of said supply passages and a supply of concentrated hydrogen peroxide, a header at the downstream end of said combustion chamber, all of said passages communicating with said header, means providing a chamber within said casing upstream of said combustion chamber into which said return passages discharge, said chamber having a perforated annular downstream wall, a fuel spray device constructed to deliver divergently into the upstream end of said combustion chamber, said fuel spray device having spider arms engaging within the upstream end of said combustion chamber, said fuel spray device having a hollow stem extending centrally through said perforated annular wall and serving to conduct liquid fuel to said spray device, an integral coaxial annular wall spaced from said stem and sealingly engaged in the central opening of said perforated annular wall, a hollow annular rim interconnecting said spider arms, one of said spider arms being hollow and establishing a communication between the interior of said hollow rim and an annular space between said stem and said coaxial annular wall, said hollow rim being radially spaced from said spray device so as to leave an annulus between them and said hollow rim having a circumferential arrangement of convergent spray nozzles, a stack of annular gauzes with silver surfaces arranged between said perforated annular wall and said spider arms, whereby a small proportion of said concentrated hydrogen peroxide delivered to said chamber passes through the perforations of said perforated annular wall and through said gauzes to be delivered in decomposed condition to the upstream end of said combustion chamber through said radial space existing between said hollow rim and said spray device, and the remainder of said concentrated hydrogen peroxide delivered to said chamber is fed through said annular space between said stem and said coaxial annular wall and through said hollow spider arm into said hollow rim, the convergent spray nozzles of said hollow rim delivering said remainder of concentrated hydrogen peroxide inwardly through the decomposed small proportion at the upstream end of the combustion chamber, and said spray device delivering said fuel outwardly through said decomposed small proportion at the upstream end of the combustion chamber.

5. A rocket motor, according to claim 4, in which the casing has an external annular manifold from which the concentrated hydrogen peroxide is fed, through ports in said casing, into the supply passages of the combustion chamber jacket.

References Cited in the file of this patent

UNITED STATES PATENTS

| | | |
|---|---|---|
| 2,555,081 | Goddard | May 29, 1951 |
| 2,591,880 | Sammons | Apr. 8, 1952 |
| 2,605,609 | Bush | Aug. 5, 1952 |
| 2,706,887 | Grow | Apr. 26, 1955 |
| 2,763,126 | Halford et al. | Sept. 18, 1956 |
| 2,791,883 | Moore et al. | May 14, 1957 |
| 2,880,577 | Halford et al. | Apr. 7, 1959 |
| 2,906,091 | Kretschmer | Sept. 29, 1959 |

FOREIGN PATENTS

| | | |
|---|---|---|
| 680,717 | Great Britain | Oct. 8, 1952 |
| 727,720 | Great Britain | Apr. 6, 1955 |